United States Patent Office 3,310,488
Patented Mar. 21, 1967

3,310,488
METHOD OF DESALINIZING WATER
Sidney Loeb and Serop Manjikian, both of Los Angeles, Calif., assignors to The Regents of the University of California, Berkeley, Calif., a corporation of California
No Drawing. Filed Mar. 5 1964, Ser. No. 349,756
10 Claims. (Cl. 210—22)

In general, the present invention relates to a method of recovering water having a low salt concentration from water having a high salt concentration. More particularly, this invention relates to a method of recovering potable water from a salt solution, such as sea water or brackish water. The method of the present invention is a method incorporating improvements over the method disclosed in applicants' copending applications, specifically:

High Flow Porous Membranes for Separating Water From Saline Solutions, Ser. No. 72.439 filed Nov. 29, 1960, now Patent No. 3,133,132, by Sidney Loeb and Srinivasa Sourirajan;

High Flow Porous Membranes for Separating Water From Saline Solutions, Ser. No. 181,013 filed Mar. 20, 1962, now Patent No. 3,133,137, by Sidney Loeb, Srinivasa Sourirajan and Dallas E. Weaver;

Desalinization Properties of High Flow Porous Membranes by Pressure Treatment Using Aluminum Ion, Ser. No. 196,337 filed May 21, 1962, now Patent No. 3,170,867, by Sidney Loeb and Gargeswari R. Nagaraj;

Fresh Water Recovery, Ser. No. 197,609, filed May 25, 1962, by Sidney Loeb;

Method of Forming Porous Membranes, Ser. No. 304,228 filed Aug. 23, 1963, by Sidney Loeb and Gargeswari R. Nagaraj; and Improved Method of Forming Porous Membranes, Ser. No. 304,243 filed Aug. 23, 1963, by Sidney Loeb and Gargeswari R. Nagaraj.

The disclosure of each of the above-identified applications is incorporated herein by the above reference thereto.

The Federal Government and the State of California have embarked on an extensive research program to solve the problem of recovering fresh water, economically, from saline water, such as sea water or brackish subsoil water bodies. Such research program has evolved many methods of recovering fresh water from sea water. To date, however, no recovery method has been made sufficiently economically. Most methods of fresh water recovery from saline solutions involve the transfer of heat under substantially thermodynamically irreversible conditions so that the process as a whole is unavoidably inefficient and a degraded form of energy, i.e., heat energy, is required. In addition, in order to attain the high rate of heat flow necessarily required, the saline solutions are normally handled at relatively high temperatures which results in severe corrosion and scale problems. The heat transfer approach also normally requires a large number of stages in series to increase heat economy, so that a large amount of equipment and much operational maintenance are required.

The method of the present invention is a simple process which can be made to approach thermodynamic reversibility to produce potable water (less than 500 p.p.m. dissolved solids) from a sea water brine containing solids in considerably greater concentration in a single step. As described in the aforementioned copending applications, when the salt water is pushed against the membrane produced by the methods described therein under a hydraulic pressure somewhat greater that the osmotic pressure of the salt solution (approximately 35 p.s.i. for fresh water-sea water interface), a reverse osmosis appears to occur and fresh water flows through the membrane from the salt water side. However, the methods described in the aforementioned copending applications have to date produced fresh water containing salt concentrations on the order of about 400–500 p.p.m. from salt water having a salt concentration of about 5000 p.p.m. Such reduction in salt concentration is quite remarkable, since, in effect, potable water is produced in one stage from brackish water. However, for many applications such potable water concentration is still relatively high and it is desirable to have a substantially lower salt concentration.

Consequently, an object of the present invention is a method of recovering water having a low salt concentration from water having a high salt concentration.

Another object of the present invention is a method of recovering from sea water, or water having a salt concentration of about 5000 p.p.m., a relatively fresh water having a salt concentration substantially lower than the salt concentration of potable water, or a salt concentration of about 500 p.p.m.

Other objects and advantages of the present invention will be readily apparent from the following description and examples which illustrate the exemplary embodiments of the present invention.

In general, the present invention involves a method of preparing a semipermeable membrane adapted to permit substantially selective diffusion therethrough of water from an aqueous solution and substantially improving the performance of such membrane by addition of a cationic surfactant in small concentration to the aqueous solution. More particularly, the method of the present invention comprises dissolving a film-forming cellulosic derivative in a volatile carrier solution adapted to permit the structural organization of a permeable membrane from the cellulosic derivative by evaporation of the carrier solution. The resulting product solution is then cast to form a thin layer of product solution and a portion of the carrier solution is then evaporated for a predetermined period of time to form a membrane. The cast membrane is then immersed in water to remove the carrier solution and then heated. Next, an aqueous solution having a high salt concentration is applied to one side of the resulting membrane under pressure and a small concentration of cationic surfactant is added to said aqueous solution. Finally, water of low salt concentration is recovered from the opposite side of the membrane. It should be noted that the terms "porosity" and "permeable" as used in this application refer only to the fact that the membrane has a structure which allows the selective flow therethrough of an appreciable rate of potable water under suitable conditions.

The film-forming cellulosic derivative utilized in the method of the present invention is a cellulosic derivative having the formula

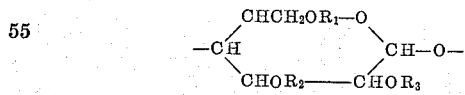

wherein $R_1$, $R_2$ and $R_3$ are members of a group consisting of $R_4$ and $CR_5O$, $R_4$ is an alkyl group containing 1 to 8 carbon atoms and $R_5$ is an alkyl group containing 1 to 7 carbon atoms. Specific examples of such cellulosic derivatives are cellulose acetate, cellulose acetate-butyrate, cellulose propionate and ethyl cellulose.

The volatile carrier solution used in the present invention is adapted to permit the structural organization of the permeable membrane from the above celluloseic derivative by evaporation of the carrier solution. Such carrier solution may consist of simply an aqueous solution of acetic acid or, preferably, substantially anhydrous acetic acid. Alternatively, the carrier solution may comprise an organic solvent having a pore-producing salt dissolved therein. Such pore-producing salt may be a salt having an anion from the class consisting of perchlorate, periodate, permanganate, perrhenate, fluoborate, thiocyanate, fluoride, bromide, iodide, tetraphenyl boron, thiocyanate, salicylate, chlorate, tetraiodo-mercurate, and fluosilicate. Although an aqueous solution of the pore-producing salt is generally preferred, the pore-producing salt may be utilized as a solid without the addition of water. An example of such salt is a salt having a thiocyanate anion, such as potassium thiocyanate. The pore-producing salt is dissolved in an organic solvent which is miscible with water and dissolves the pore-producing salt. Such organic solvent provides a casting solution of desired viscosity so that the solutions are not too viscous to prevent casting of uniform films, but sufficiently viscous to prevent the film produced from becoming jelly-like upon immersion in water. Typical organic solvents which have been found useful in the present invention are acetone, methyl ethyl ketone, ethyl alcohol, methyl alcohol and mixtures of one or more of such solvent. It should be noted that acetone has been found to give unexpectedly good results with respect to the resulting membrane characteristics. The weight ratio of the organic solvent to cellulosic derivative is normally in the range of about 2/1 to 6/1, with the ratio of about 3/1 being preferred, especially for the combination of the acetone and cellulose acetate. The weight ratio of the aqueous pore-producing salt solution to the cellulosic derivative is about 3/1 to 1/3, with the ratio of about 1/2 being preferred. The concentration of the pore-producing salt in the aqueous solution may range from about 5% by weight to a saturated solution. Thus, in the case of magnesium perchlorate, the weight percent may range from about 5% in the present invention. By use of such organic solvents, acetic acid and formic acid have been found useful in the present invent ion. By use of such organic solvents, it has been found that the casting and immersion could be done at room temperature and thus eliminate the necessity of cooling the casting and immersion solutions when organic solvents, such as acetone, are utilized. It seems that the low volatility of such organic solvents prevents them from readily evaporating from freshly cast membranes and thus permits such casting and immersion at room temperature.

After the product solution has been prepared by mixing the above-described film-forming cellulosic derivative in the carrier solution, it is then cast to form a thin layer of product solution. Preferably, the product solution is filtered at ambient temperature before its subsequent use in film casting, since such filtration removes a certain amount of undissolved matter which contributes to inhomogeneities in the subsequently cast film. In the case of the more highly volatile, organic solvents, such as acetone, the solution is cast at a temperature of about −8° C. to 11° C. on a cold glass plate. Alternatively, when a carrier solution having a lower volatility is utilized, such as acetic acid, such casting may be conducted at room temperature. In any event, the actual procedure is to pour the product solution onto a glass plate having 0.01 inch side runners to give this thickness to the cast film. The film thickness is then formed by passing an inclined knife across the glass plate which rests on the side runners. The inclined knife is preferably pulled across the plate at a predetermined slow rate. For example, when the length of the plate is about 8 inches, the transverse of the knife required is normally accomplished in the range of about 0.13 to 0.24 minute without substantially affecting the results. Particularly, with a highly volatile carrier solution, too slow a period of time permits excessive evaporation, while too fast a traverse time results in an imperfect surface formation or even rupture of the film.

A portion of the carrier solution is then evaporated for a predetermined period of time. For the specific example of the carrier solutions set forth above, such predetermined period of time is usually in the range of about 3 to 15 minutes.

The cast membrane is then immersed in water to remove the carrier solution therefrom. Such immersion is usually contained for at least about an hour. The cast membrane is then removed from the glass plate and heated in hot water for about 15 minutes at a predetermined temperature. Usually, the heating temperature is in the range of about 70° to 90° C. and the heating time, while not critical, should exceed about ½ minute for best results. Alternatively, the heating step may involve immersing in water at about 50° C. and heating up to about 80° C. over a period of about one-half hour.

The resulting membrane then has an aqueous solution having a high salt concentration applied under pressure to one side thereof. An example of such arrangement is set forth in the copending application set forth above, Ser. No. 72,439, filed Nov. 29, 1960. However, for the test data set forth below in Table I, the concentrated brine stream and the stream of water having a low salt concentration coming from the desalinization cell are recombined and recycled to the feed tank.

Finally, a small concentration of cationic surfactant is added to the aqueous solution having a high salt concentration which enters the desalinization cell. Preferably, such cationic surfactant has a concentration above about 40 p.p.m. and usually has a concentration in the range of about 40 to 160 p.p.m. Such cationic surfactant may be an ammonium halide having four hydrocarbon containing groups attached to the nitrogen ion. Some specific examples of such cationic surfactants are alkyl dimethyl benzyl ammonium chloride where the alkyl group contains about 8 to 18 carbon atoms (sold under the trademark "Zephiran"), soya trimethyl ammonium chloride (sold under the trademark "Arquad S–50"), and hexadecyl trimethyl ammonium bromide.

A specific example of the utilization of the present invention is set forth below in Table I. To obtain the data set forth in Table I, a membrane was prepared, as generally described above, with the casting solution composition of the membrane being specifically as follows:

| Compound: | Weight percent |
|---|---|
| Acetone | 69.5 |
| Cellulose acetate | 23.1 |
| Water | 5.5 |
| Magnesium perchlorate | 1.6 |
| Hydrochloric acid | 0.3 |

The cast membrane formed from the above composition was heated in water to a temperature of about 70–72° C. After heating, the membrane was used by applying the side of the membrane which was away from the glass during the casting toward the aqueous solution having a high salt concentration from which the water having a low salt concentration was recovered. A feed solution having a salt concentration of about 5000 p.p.m. was then applied to the membrane under an operating pressure of about 600 p.s.i.g. The production rate of the desalinized water and the salt content of the water produced was then measured. (See Table I, col. 5.)

As set forth in Table I, a variety of cationic surfactants were tested and found to improve desalination by about 35% to 60%, while other surfactants, such as non-ionic and anionic surfactants, resulted in either no change or an increase in the product salt content.

The production rate of the membrane may be increased by the addition of a pore-regulating compound to the casting solution which dissolves therein. Such a pore-regulating compound usually will not alone result in an appreciable production rate through the membrane. However, it does have the surprising and unexpected result of increasing the production rate through the membrane in combination with the pore-producing salt. Such pore-producing salt usually has an anion from the class consisting of halides and peroxygenated halides. Specific pore-regulating compounds which have been found useful in the present invention include sodium chloride, sodium bromide, sodium iodide, sodium chlorate, hydrochloric acid, magnesium chloride, lithium chloride, and aluminum chloride. However, the use of sodium chloride and hydrochloric acid has been found to be unusually and unexpectedly beneficial and both increases the production rate and reduces the product salt content. The weight ratio of the pore-producing salt to the pore-regulating compound should be in the range of about 10/1 to 2/1, with the ratio of about 10/2 being preferred, especially in the combination of magnesium perchlorate and sodium chloride.

TABLE 1.—THE EFFECT OF SURFACTANTS ON MEMBRANE PERFORMANCE CHARACTERISTICS

| Control | | Surfactant | Nature of Surfactant | Amount of Surfactant in Brine, p.p.m. | Test | | Percent Change in Product Salt Content due to Surfactant Decrease-Increase | Curing Temp., °C. |
|---|---|---|---|---|---|---|---|---|
| Product Salt Content, p.p.m. | Product Flux, gal./ft.² day | | | | Product Salt Content, p.p.m. | Product Flux, gal./ft.² day | | |
| 425 | 34 | Alkyl dimethyl benzylammonium chloride (Zephiran). | Catonic | 50 | 221 | 33 | −48 | 71.4 |
| 493 | 34 | Soya trimethyl ammonium chloride (Arquad S-50). | do | 50 | 187 | 30 | −62 | 71.4 |
| 476 | 14.6 | Hexadecyl trimethyl ammonium bromide. | do | 50 | 306 | 14 | −36 | 71.4 |
| 510 | 31.6 | Carboxone | Non-ionic | 50 | 510 | 30 | 0 | 71.4 |
| 408 | 31 | Alkyl Benzene Sulfonate (dodecyl benzene sulfonate, sodium). | Anionic | 50 | 646 | 33 | 37 | 71.4 |
| 680 | 34.6 | Sodium lauryl sulfate | do | 50 | 818 | 34.6 | 20 | 71.4 |
| 680 | 35 | Triethanolamine lauryl sulfate | do | 50 | 935 | 24.3 | 37.5 | 71.4 |

The cast membrane may be treated by immersing it in a cold solution of an inorganic treating salt. Among other possible effects, such treatment has been found to remove the inorganic salt in the membrane and to reduce the porosity of the membrane. The treating salt solution is preferably below 0° C., with a preferred temperature of about −5° C. The treating salt may be any of the salts utilized as a pore-regulating salt and, in fact, the treating salt may be the same salt as used for pore regulation. However, it is preferred that sodium chloride be utilized in the treating salt solution with a concentration in the range of about 5% to 25% by weight.

There are many features in the present invention which clearly show the significant advance the present invention represents over the prior art. Consequently, only a few of the more outstanding features will be pointed out to illustrate the unexpected and unusual results attained by the present invention. One feature of the present invention is that it utilizes a cationic surfactant to decrease the salt content in the water passing through the cast membrane without substantially affecting the production rate of the water passing through the membrane. Such feature is believed to be produced by the loose adsorption of the cationic surfactant on the surface of the membrane due to the positive charge of the cation with the long alkyl tail of the membrane oriented away from the surface of the membrane. Such adsorption could influence desalinization by giving a net positive charge to the surface of the membrane so that it acts as an ion-selective membrane. Thus, for electro-neutrality reasons, such a membrane would reject both ions in osmotic operation. Also, possibly the presence of the long-chain alkyl groups on the membrane surface changes the interfacial tension characteristics to cause negative adsorption of ion in accordance with the Gibbs adsorption equation which in turn improves desalinization. Such theories may explain the operation of the present invention, but they should be regarded merely as probable explanations for the unusual and unexpected results achieved by the present invention and not as a limitation on the invention.

It will be understood that the foregoing description and examples are only illustrative of the present invention and it is not intended that the invention be limited thereto. All substitutions, alterations and modifications of the present invention which come within the scope of the following claims or to which this invention is readily susceptible without departing from the spirit and scope of this disclosure are considered part of the present invention.

We claim:

1. A method of recovering water having low salt concentration from water having a high salt concentration, comprising:
    (a) dissolving a film-forming cellulosic derivative in a volatile carrier solution adapted to permit the structural organization of a permeable membrane from said cellulosic derivative by evaporation of said carrier solution;
    (b) casting the resulting product solution to form a thin layer of product solution;
    (c) evaporating a portion of said carrier solution for a predetermined period of time to form a membrane;
    (d) immersing the cast membrane in water to remove said carrier solution;
    (e) heating the cast membrane in water;
    (f) applying under pressure to one side of the resulting membrane an aqueous solution having a high salt concentration; and
    (g) adding a small concentration of water-soluble cationic surfactant to said aqueous solution, and
    (h) recovering water having low salt concentration from the other side of said membrane.

2. A method as stated in claim 1 wherein said cationic surfactant concentration is above about 40 p.p.m.

3. A method as stated in claim 1 wherein said cationic surfactant is a quaternary ammonium halide having four hydrocarbon containing groups attached thereto.

4. A method as stated in claim 3 wherein said cationic surfactant is a member of the class consisting of alkyl dimethyl benzyl ammonium chloride, soya trimethyl ammonium chloride and hexadecyl trimethyl ammonium bromide.

5. A method as stated in claim 1 wherein said carrier solution is an aqueous solution of a pore-producing salt in an organic solvent.

6. A method as stated in claim 5 wherein said pore-producing salt is a salt having an anion from the class consisting of perchlorate, periodate, permanganate, perrhenate, fluoborate, thiocyanate, fluoride, bromide, iodide, tetraphenyl boron, thiocyanate, salicylate, chlorate, tetraiodo-mercurate and fluosilicate.

7. A method as stated in claim 6 wherein said pore-producing salt is magnesium perchlorate.

8. A method as stated in claim 1 wherein said carrier solution is acetic acid.

9. A method as stated in claim 1 wherein said film-forming cellulosic derivative has the formula

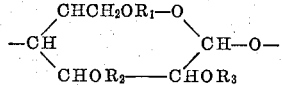

wherein $R_1$, $R_2$ and $R_3$ are members of a group consisting of $R_4$ and $CR_5O$, $R_4$ is an alkyl group containing 1 to 8 carbon atoms and $R_5$ is an alkyl group containing 1 to 7 carbon atoms.

10. A method as stated in claim 9 wherein said cellulosic derivative is a member of the class consisting of cellulose acetate, cellulose acetate-butyrate, cellulose propionate and ethyl cellulose.

References Cited by the Examiner

UNITED STATES PATENTS 3,133,132  5/1964  Loeb et al. _____ 264—49

OTHER REFERENCES

Weissberger, Arnold: Ed. Technique of Organic Chemistry, vol. III, Part I, Separation and Purification, 2nd edition, New York, Interscience Publishers, 1956, pp. 713–718.

MORRIS O. WOLK, *Primary Examiner.*

E. G. WHITBY, *Assistant Examiner.*